UNITED STATES PATENT OFFICE.

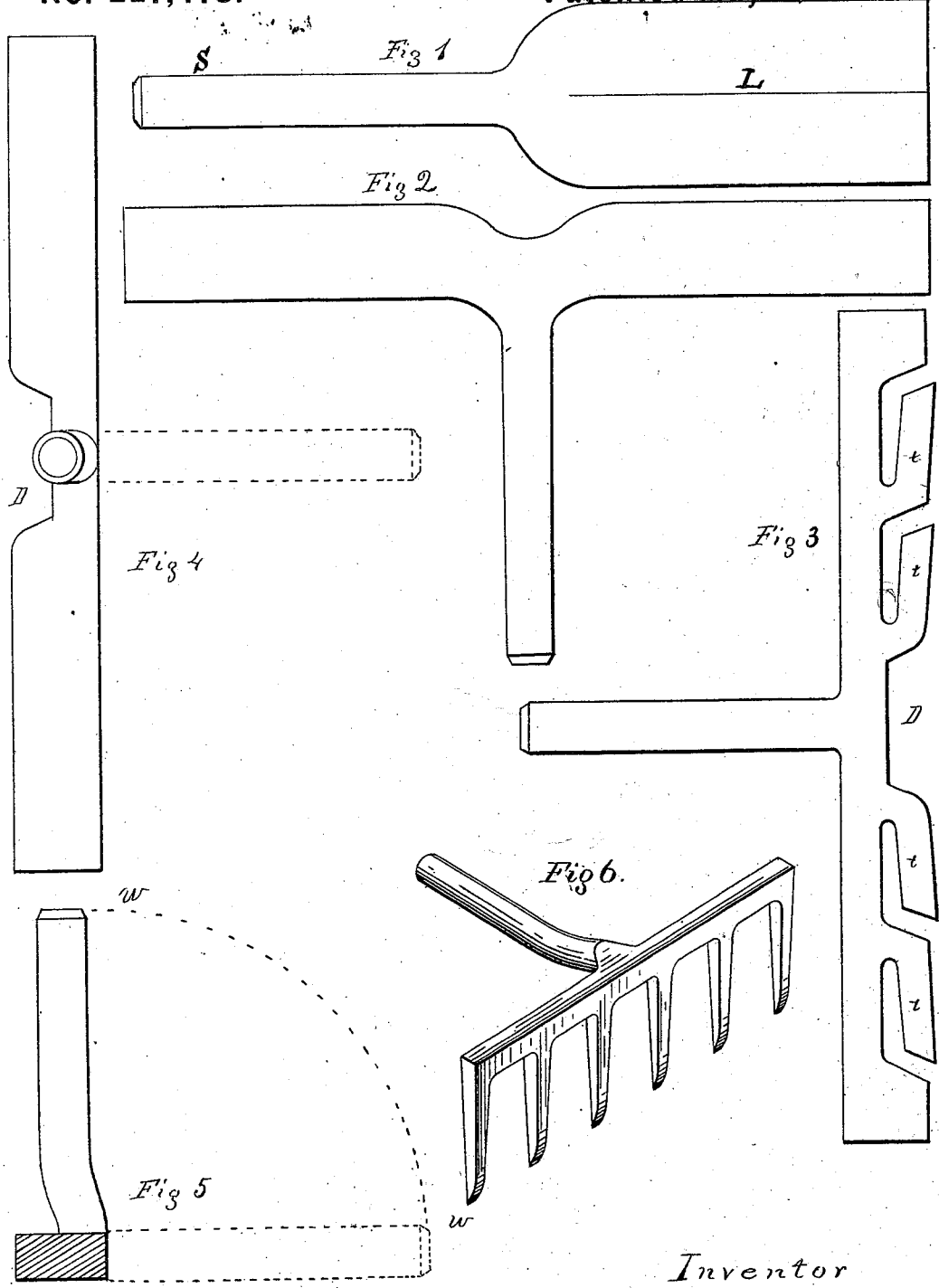

CALVIN T. BEEBE, OF JACKSON, MICHIGAN, ASSIGNOR TO THE WITHINGTON & COOLEY MANUFACTURING COMPANY, OF SAME PLACE.

CAST-STEEL GARDEN-RAKE.

SPECIFICATION forming part of Letters Patent No. 227,473, dated May 11, 1880.

Application filed July 19, 1878.

*To all whom it may concern:*

Be it known that I, CALVIN T. BEEBE, of the city of Jackson, in the county of Jackson and State of Michigan, have invented a new and useful Improvement in Cast-Steel Garden-Rakes, of which the following is a specification.

This invention relates to that class of garden-rakes that are made by cutting, turning out, and drawing the teeth from one side of a bar of steel, while the remaining side forms the bar or head of rake.

Heretofore such rakes have been made with an iron shank attached to the bar or head between the two middle teeth by welding.

This method is objectionable, for the reason that it is difficult to weld iron to steel perfectly. Consequently many shanks are broken off in process of manufacture, and more show imperfect contact at the weld, which, though it may be strong, yet the imperfection makes the rake unsalable.

The object of my invention is to avoid the necessity of welding on a shank, and thus obviate these objections.

The invention consists in making a rake with a shank solid to the bar or head of rake by forging it from the same pattern that the head and teeth are forged from, thus making what may be termed a "solid-shank cast-steel rake," the shank being forged on in place of being welded on.

The process of manufacture is as follows: First, a pattern of proper length for a given number of teeth is cut from a bar of steel of the thickness usually used for making cast-steel rakes, but of double the usual width. On one end of this the shank for the rake is drawn, as shown in Fig. 1 at S. The remaining portion of pattern is then split along the line L nearly to the shank, as shown in Fig. 1. The two sides of pattern are next spread apart and straightened out, as shown in Figs. 2 and 3, the shank projecting from the edge of bar that is to form the top of rake-head in the center and at right angle to the same. The depression D is next formed in the bar opposite to the shank for the space between the two middle teeth of rake. The teeth may now be cut, ready to be turned out and drawn, as shown in Fig. 3 at *t t*. The next operation is to change the position of shank, as shown in Fig. 3, to a position perpendicular to the side of the rake, as shown in Fig. 4. This is done by twisting that portion of the head between the two middle teeth one-quarter way round, as shown by the dotted lines in Fig. 5 at *w w*, the stock between said teeth having been left heavier than required when finished, so that after twisting the marks may be hammered out while working this portion of the head to the proper size.

The twisting of that portion of the head between the two middle teeth to place the shank of rake in its proper position is the main feature of the improvement, as it enables me to get a shank solid to the head of the rake. After the shank is in proper position the teeth previously cut may be turned out and drawn in the usual way.

I do not confine myself to cutting the teeth before the shank is twisted into place; but if for any reason it is better to twist shank into position before cutting the teeth, it may be done; and in fact the teeth may be drawn, if desired, before twisting shank into the position required for a finished rake.

Fig. 6 represents, on a reduced scale, a finished rake head and shank made in accordance with my invention.

What I claim is—

1. The hereinbefore-described method of manufacturing rakes, which consists in drawing out the end for the shank, as shown in Fig. 1, slitting the bar and spreading the slitted portions apart to form the head, setting down the center thereof, and cutting the same, as shown in Fig. 3, twisting the middle shank-bearing portion of the head so as to place the shank at about right angles to the head, and finally drawing out the teeth, as set forth.

2. As a new article of manufacture, a cast-steel garden-rake the shank of which projects from the side of the bar or head at the center, and is integral with the head, as hereinbefore shown and described.

C. T. BEEBE.

Witnesses:
GEORGE HANCHETT,
W. W. MILLIMAN.